United States Patent Office 3,536,483
Patented Oct. 27, 1970

3,536,483
METHOD OF MAKING ELECTROGRAPHS
WHEREIN THE RESULTANT ELECTRO-
STATIC IMAGE IS NOT EFFECTED BY
FURTHER LIGHT EXPOSURE
Yoshiyuki Watanabe, Tokyo-to, and Koichi Kinoshita, Narashino-shi, Japan, assignors to Katsuragawa Denki Kabushiki Kaisha, Tokyo-to, Japan, a joint-stock company of Japan
Continuation-in-part of application Ser. No. 471,606, July 13, 1965. This application Aug. 20, 1965, Ser. No. 481,365
Claims priority, application Japan, Oct. 20, 1964, 39/59,570
Int. Cl. G03g 13/22
U.S. Cl. 96—1                   12 Claims

ABSTRACT OF THE DISCLOSURE

In a method of electrophotography in which a photosensitive element is utilized comprising a photosensitive layer, a highly insulative layer integrally bonded to one surface of the photosensitive layer, and in which an electrostatic latent image is formed on the surface of the highly insulative layer by a method comprising the steps of disposing a transparent electrode in contact with the highly insulative layer, applying an electrode on the opposite sides of the photosensitive layer, applying an electric field of one polarity across said two electrodes, and applying a second electric field of the opposite polarity across said two electrodes concurrently with irradiation of a light image onto the photosensitive element through the transparent electrode, the transparent electrode is removed while said second electric field is still being applied after termination of the irradiation of the light image. In a modified embodiment in lieu of the transparent electrode, a corona discharge electrode or electrodes are used.

---

This invention relates to a method and apparatus for making electrographs, and more particularly to improvements relating to the method and apparatus for producing an electrostatic latent image of an object disclosed in our copending patent application Ser. No. 471,606, filed on July 13, 1965, now Pat. No. 3,457,070, dated July 22, 1969, of which the instant application is a continuation-in-part.

According to said copending patent application, use is made of a photosensitive element consisting of a photosensitive layer, a highly insulative film bonded to the upper surface of the photosensitive layer and an electrode bonded to the rear surface of said photosensitive layer, and a electrostatic image of a light image of an object is formed on the highly insulative film by a method comprising the steps of disposing a transparent electrode in contact against said highly insulative film, applying a first D-C voltage of one polarity across said transparent electrode and said electrode of the photosensitive element in the absence of external light rays, applying a second D-C voltage of opposite polarity immediately after or a predetermined interval after the interruption of said first D-C voltage, projecting a light image of an object upon said photosensitive layer through said transparent electrode while said second D-C voltage of opposite polarity is being applied, interrupting the application of said second D-C voltage concurrently with or a short time after projection of said light image is stopped, and separating said transparent electrode from said photosensitive element thereby to form on said highly sensitive film an electrostatic latent image of said light image.

This method is more advantageous than any one of many prior methods of making electrographs including the so-called xerography and persistent internal polarization methods, especially in that the electrostatic latent image is not released by later irradiation of light rays, so that the latent image formed can be stored and developed under light rays and can be released or erased only by applying an electric field.

However, as a result of further research we have found that by the method described above, upon interruption of the application of the voltage or external field, a substantial percentage of the electric charge is released without contributing to the intensity of the latent image. In addition, said method cannot produce the latent image continuously.

It is therefore an object of this invention to provide an intense electrostatic latent image of resolution.

A further object of this invention is to provide a novel method of forming an electrostatic latent image which can prevent attenuation thereof before development.

A still further object of this invention is to provide a novel method of continuously forming a latent image.

Yet another object of this invention is to provide a new and improved apparatus for making an electrostatic latent image utilizing a corona discharge electrode in lieu of said transparent electrode.

In accordance with one aspect of this invention the same photosensitive element and the same process steps as those disclosed in said copending application are used except that the transparent electrode is removed from the photosensitive element while a voltage or electric field is being applied across the transparent electrode and the electrode of the photo-conductive element, thus greatly improving the resolution of the latent image.

In accordance with another aspect of this invention a photosensitive element is prepared by bonding finely divided particles of a photosensitive material by means of an electric insulating material which is transparent to light, shaping the bonded particles into a thin layer to provide a photosensitive layer, integrally bonding to one surface of said photosensitive layer a transparent highly insulative film and integrally applying an electrode on the opposite surface of said photosensitive layer, and an electrostatic latent image of an object is formed by the steps of positioning a corona discharge electrode in close proximity to but spaced apart by a definite distance from the surface of said highly insulative film, continuously moving said corona discharge electrode to scan said photosensitive element while a high potential of one polarity is being applied across said corona discharge electrode and said electrode of said photosensitive element, applying a second high potential of the opposite polarity across said electrodes and continuously moving said corona discharge electrode relative to said photosensitive element to scan it concurrently with the irradiation of a light image of an object onto said photosensitive element thereby to form on said photosensitive element an electrostatic latent image of said light image.

An electrographic apparatus embodying the principle of this invention adapted to continuously form a latent image comprises: a cylindrical photosensitive element consisting of a photosensitive layer, a transparent highly insulative film integrally bonded to one surface of said photosensitive layer and an electrode of an electric conductive material integrally bonded to the opposite surface of said photosensitive layer; means to rotate said cylindrical photosensitive element; a first corona discharge electrode located on one side of said photosensitive element in close proximity to the surface of said highly insulative film, said corona discharge electrode including a high voltage discharge electrode and a cylindrical grounded electrode enclosing said high voltage electrode and a transparent electrode attached to one end of said grounded electrode opposite to said photosensitive element; a lens system to project a light image of an object on the surface of said highly insulative film whereby to continuously scan said photosensitive element; a second corona discharge electrode located in close proximity to said highly insulative film on the near side of said first corona discharge electrode is viewed in the direction of said cylindrical photosensitive element, said second corona discharge electrode including a high voltage electrode and a cylindrical grounded electrode enclosing said last mentioned high voltage electrode; a light shield means for said first and second corona discharge electrodes; and means to apply a high D-C voltage across the electrode of said photosensitive element and the high voltage electrode of said first corona discharge electrode.

The novel features which characterize the invention are set forth with particularity in the appended claims. The invention itself, however, both as to its organization and method of operation together with further objects and advantages thereof may best be understood by reference to the following description taken in connection with the accompanying drawings in which like parts are designated by like reference numerals, and in which:

Figure 1:
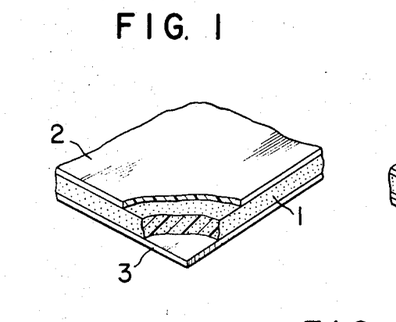
FIGS. 1 and 2 are fragmentary perspective views, partly broken away, of two forms of photosensitive elements suitable for use in the method of making electrographs according to this invention.

As has been pointed out before, in carrying out the method of this invention, a photosensitive element as disclosed in our copending patent application Ser. No. 471,606 is utilized. More specifically, as shown in FIG. 1 of the accompanying drawing, the photosensitive element comprises a photosensitive layer 1 of a photoconductive material, a film 2 of highly insulative material and an electrode 3 which are bonded into a unitary structure. In the case shown in FIG. 2 an additional film of highly insulative material 2a is interposed between the photosensitive layer 1 and the electrode 3.

Figure 2:
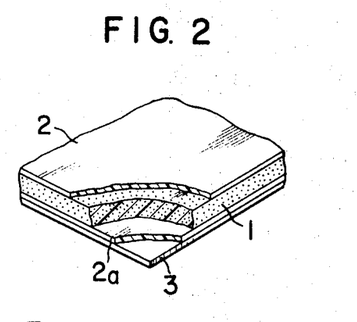

In both types of the photosensitive elements, the highly insulative film 2 is bonded to the photosensitive layer 1 by means of a highly insulative binder, and the electrode 3 is bonded by means of a suitable binder. The thickness of the photosensitive element is selected to be sufficiently thin and flexible in order to prevent decrease in the optical resolution and to form a firm bond with a transparent electrode which is described later.

Figure 3:
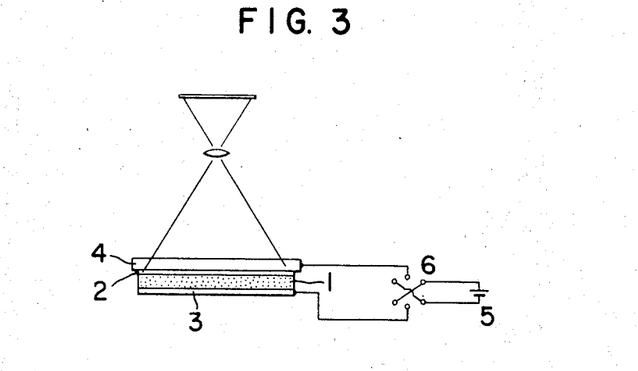
FIG. 3 is a diagrammatic representation of the arrangement of various elements at the time of forming an electrostatic latent image.

As shown in FIG. 3, a transparent electrode 4 is urged against the upper surface of the highly insulative layer 2 by means of a suitable means, not shown, and a source of power supply, such as a battery 5, and a change-over switch 6 are provided in order to apply a D-C voltage of positive or negative polarity across the electrode 3 and the transparent electrode 4. Further various component elements are so arranged that the light image to be recorded can be projected or irradiated upon the photosensitive layer 1 through the transparent electrode 4, thus permitting suitable control of the application of voltage and irradiation of the light image.

Figure 4:
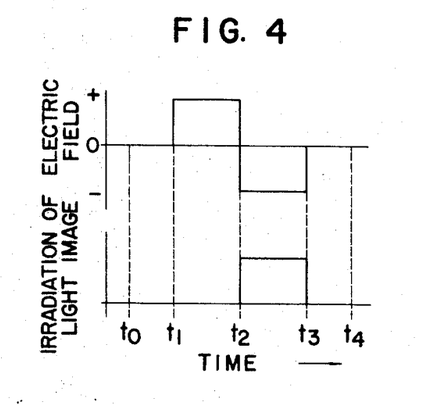
FIG. 4 is a graph to represent the relation between the electric field and irradiation of a light image.

According to said copending patent application the method of forming an electrostatic image comprises the steps of (a) urging the transparent electrode 4 against the surface of the highly insulative film 2 of the photosensitive element at a time to, FIG. 4 (b) applying a D-C field of a suitable polarity which is selected according to the polarity desired for the latent image between the electrode 3 and the transparent electrode 4 during the period of from $t_1$ to $t_2$, in the absence of irradiation of light rays, (c) reversing the polarity of the applied field at a time $t_2$ while at the same time projecting the light image upon the photosensitive layer 1 through the transparent electrode 4 and the highly insulative film, (d) concurrently interrupting the application of the electric field and the projection of the light image at a time $t_3$, and (e) separating the transparent electrode 4 from the photosensitive element after a suitable time internal or at a time $t_4$ thereby to form an electrostatic latent image of the light image on the surface of the photosensitive element wherein at bright portions of the light image an electrostatic charge is formed having the same polarity as that of the D-C voltage applied upon the transparent electrode 4 during the interval of from $t_2$ to $t_3$, whereas no charge is formed at dark portions of the light image, said latent image being characterized by being not readily released or erased after separation of the transparent electrode from the photosensitive element by any external light rays but released or attenuated by the application of an electric field for the purpose of erasing it or by urging against or bringing close to the surface containing the latent image a substance which is maintained at the same potential as the electrode 3 of the photosensitive element.

Thus, it is possible to render visible the latent image at any desired time by utilizing charged or not charged powder, and the visible image of the powder can be readily transfer printed onto any other suitable recording paper, if desired. The photosensitive element can be used repeatedly to produce electrostatic latent images of any desired light images by repeating the above described process steps.

However, it is difficult to apply said method of making electrographs to a mechanism operating continuously at a high speed.

Accordingly it is an object of this invention to provide a novel method of making electrographs which is suitable for use in such a high speed machine.

Figure 5:
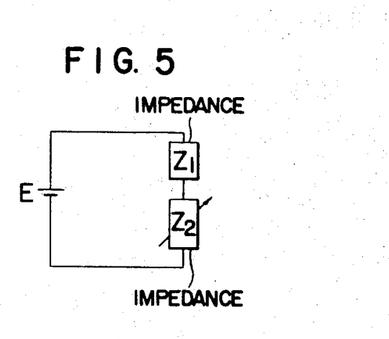
FIG. 5 is a schematic equivalent circuit of the photosensitive element.

The principle of forming the latent image by an electrographic method employing a perfectly insulated photosensitive element is based on the fact that the distribution of the electrostatic field or electric potential applied from the outside is determined by the relative magnitudes of the impedance $Z_1$, FIG. 5, formed by the highly insulative film of the photosensitive element and a series impedance $Z_2$ formed by the layer of the photoconductive substance, and hence the electrostatic charge on the surface of the photosensitive element is determined by the intensity of electric field across the impedance $Z_1$.

In addition, the intensity of the electrostatic charge is primarily determined by the dielectric constants and thicknesses of the highly insulative film and the layer of photoconductive substance, respectively, when the effects of air gaps caused by incomplete contact of the electrodes and the internal polarization caused by uneven distribution of charge carriers are neglected.

The dielectric constant $\epsilon$ of the layer of the photoconductive substance is low in the absence of irradiation of light rays from the outside, so that the effective thickness of said layer $d/\epsilon$, where $d$ represents the thickness thereof, is large. On the other hand, upon irradiation of light rays the dielectric constant decreases the effective thickness $d/\epsilon$, thus resulting in an increase in the effective voltage impressed across the impedance $Z_1$ as well as the intensity in the charge on the surface of the photosensitive element.

When said air gap or contact resistance at the interface between the electrode and the highly insulative film is neglected, the intensity of the electric field impressed across the highly insulative film or the field directly influencing image formation is given by the following equation.

$$E \cdot \left. \frac{\frac{d_1}{\epsilon_1}}{\frac{d_1}{\epsilon_1}+\frac{d_2}{\epsilon_2}} \right| d_1 = E \cdot \frac{\epsilon_2}{\epsilon_2 d_1 + \epsilon_1 d_2}$$

where E represents the electric field impressed upon the photosensitive elements, $d_1$ and $d_2$ are the thicknesses of the highly insulative film and the layer of the photoconductive layer, and $\epsilon_1$ and $\epsilon_2$ are the dielectric constants of the film and layer, respectively. If it is assumed that $d_1$, $d_2$ and $\epsilon_1$ are constant, then if $d_2$ is far greater than $d_1$, the intensity of the electric field will be mainly determined by the value of $\epsilon_2$, thus increasing with the increase of $\epsilon_2$. However, even when $d_1$ has a magnitude that cannot be neglected with respect to $d_2$, it is possible to design the apparatus so as to cause sufficient variation in the intensity of the electric field that has an influence upon the image formation in response to the variation in $\epsilon_2$ caused by external light rays.

More particularly, if $\epsilon_2$ is increased to cause the layer of the photoconductive substance to become a perfect conductor, the intensity of the electric field impressed across the highly insulative layer will become $E/d_1$. However, in practice, the variation of the dielectric constant of the layer of the photoconductive substance of a photosensitive element is limited by its inherent characteristics, so that, in view of the sensitivity requred for the electrographc method, desirable conditions for forming satisfactory images are to establish a proper relationship between the impedances of the highly insulative film and of the layer of photoconductive layer and to limit as far as possible the increase in the dielectric constant $\epsilon_2$ of the photosensitive layer at dark portions thereof when it is irradiated by a light image in order to improve the signal-to-noise ratio, rather than to increase $\epsilon_2$ by irradiating with intense light rays.

For this reason, in the basic method disclosed in said copending patent application, it is possible to decrease sufficiently the dielectric constant $\epsilon_2$ of the layer of the photoconductive substance by applying an electric field of a polarity opposite to that of the electric field which is applied in a dark space for the purpose of forming an image prior to the irradiation by the light image.

We have analyzed the effect of the electric field of the opposite polarity which is applied prior to the irradiation by light rays and the effect of the electric field which is applied concurrently with the irradiation by light rays upon the formation of the latent image and have found many facts as described below. In order to facilitate understanding, the step of applying a D-C field in a dark space at the first stage is hereinafter referred to as application of a first electric field or field, and the step of applying a D-C field of the opposite polarity relative to that of the first field concurrently with the irradiation of the light image is referred to as the application of a second electric field.

Application of the first field results in the erasure of the hysteresis caused by irradiation of light rays upon the photosensitive element or the hysteresis of the electrostatic charge, so that a signal-to-noise ratio is obtained upon subsequent irradiation of the light image. Although such a phenomenon is observed in any photosensitive element utilizing one of many photoconductors, its effects are not definite but vary with the type of photoconductor used. It was found that photoconductors exhibiting remarkable effects are those having a photoconductivity closely related to the trap level, such as CdS and ZnSe.

While the effect of the first field is a function of the intensity of the applied field and the interval of field application and varies in accordance with the state of the applied field, such an effect generally approaches a constant value within a relatively short time, for example, in less than $\frac{1}{100}$ second in the case of a thin layer of CdS: Cu having a thickness of 100 microns. Furthermore, the effect of increasing the intensity of the applied electric field is not constant. Thus, with a layer of CdS:Cu having a thickness of 100 microns, ample effect can be observed under a relatively weak field of less than 1000 v., and any rapid charge in said effect can be observed even when the intensity of the electric field is increased beyond 1000 v.

Since the purpose of applying the first field is to improve the signal-to-noise ratio when the light image is projected concurrently with subsequent application to the second field, it will be obvious to those skilled in the art that any means exhibiting analogous effect may be substituted for the first field. When infrared rays having a longer wavelength than the absorption wavelength of the photoconductor are projected the signal-to-noise ratio is improved by a certain degree. However, it was found that irradiation by such infrared rays is not desirable because its effect is not comparable with that of the first field, and because there are problems concerning the interval of irradiation as well as the intensity of the irradiating light rays.

In the photosensitive layer, when the dark space resistance thereof has been increased by the application of the first field, the dielectric constant at portions of the layer which are irradiated during subsequent irradiation of the light image is increased. Consequently, where an insulated type photosensitive element is used, as a result of the second field which is applied concurrently, the intensity of the field across portions of the highly insulative layer subjected to light rays becomes much higher than that of portions not subjected to light rays, thereby establishing a strong electrostatic charge on the upper surface of the film at portions irradiated by light rays.

It is to be understood that the electrostatic charge on the rear surface of the highly insulative film has an important function of preserving the electrostatic charge on the upper surface. However, in the electrograph technique utilizing a photosensitive layer consisting of a powder of crystals as in this invention or in those utilizing an element including a multiple layer construction made up by layers of different substances, it is considered that an electrostatic charge of the opposite polarity relative to that of the electrostatic charge on the surface of the element is created on the rear surface of the highly insulative film on the surface of the photosensitive layer and in the interior thereof when an electrostatic charge exists on the surface of the photosensitive element. The presence of this internal electrostatic charge is very important not only to effectively decrease the thickness of the insulative layer but also to preserve the latent image formed in a dark space. Since this function of preserving the latent image is highly effective, when the latent image is once formed, it is not released through the transparent electrode even when it is maintained in contact with the photosensitive element in the dark space.

The intensity of the electrostatic charge on the rear surface essentially depends on the quantity of the charge carriers flowing through the photoconductive layer as well as the quality of the charge carriers flowing out from the crystals of the photoconductive substance, it being understood that flow of the photoelectric current is closely related to the characteristics of the surface of the crystal of the photoconductive substance.

More particularly, as one example, fine grains of crystals were bonded together by means of a binder having a relatively high resistance into a thin layer, a D-C voltage was applied across the layer, and the photoelectric current flowing through an external measuring circuit was measured. The photosensitive element includes an electrically photosensitive layer that exhibit persistent internal polarization, as explained in the aforesaid Pat. No. 3,457,070.

Figure 6A:
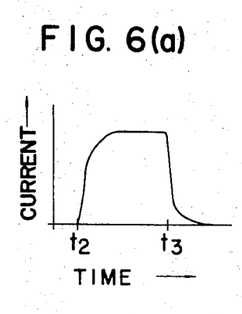
FIG. 6 shows graphs of current characteristic curves of a photosensitive layer at the time of voltage application.
Figure 6B:
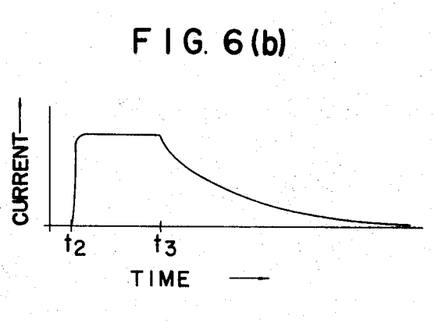

Referring now to FIG. 6a which shows the results of this measurement, the response or the build up of the photoelectric current at a time $t_2$ at which irradiation with light rays of constant intensity was commenced is poor, whereas the response or attenuation of the photoelectric current at a time $t_3$ at which the irradiation of light rays was interrupted is very steep. It appears that this is caused by the resistance charge owing to variation in the difference of work functions at the interface between photoconductive crystals and the binder and by the effect of the dielectric polarization related to trap levels.

It was found that, when the resistance is measured by means of an A-C current to measure the density of current conductive electrons in the crystals of the photosensitive substance, the build-up characteristics of the photoelectric current at the commencement of irradiation of light rays in steep, whereas the attenuation is slow, contrary to the case of employing a D-C current. This proves the correctness of said assumption.

Therefore, formation of an image by the irradiation of light rays under a D-C field is effected more advantageously where all of the electrons existing in the conductive band contribute to form the image owing to rapid decrease in the resistance at the interface which occurs concurrently with the irradiation of light rays even though the build-up of the photoelectric current is slow when compared with the case wherein the electrostatic charge is the photosensitive layer or on the rear surface of the insulative film is rapidly established to contribute to the formation of the latest image as in the case of a rapid build-up of the photoelectric current. However, it is difficult to obtain satisfactory results when an attempt is made to form a latent image by applying an electric field immediately after interruption of the irradiation of light rays by ignoring the fact that numerous electrons are still remaining in the conductive band.

It has been considered that the electrostatic charge under an electric field has an intensity sufficient to balance a field applied from the outside whether the electrostatic charge is formed on the surface or whether it is formed in the interior of a photosensitive element so that, upon interruption of the application of the external field, a portion of the charge will be released.

The method of making electrographs disclosed in said copending application utilizes the possibility of preserving a sufficiently strong latent image on the surface of a photosensitive element even after interruption of the external field with a transparent electrode maintained in contact with the photosensitive element since a sufficiently strong electrostatic charge remains to form the latent image, thereby maintaining a balance between the interior and exterior of the photosensitive element. However, by later investigations we have found that, upon interruption of the external field, a substantial percentage of the electric charge is released without contributing to the intensity of the latent image.

In view of various characteristics described hereinbefore, this invention contemplates effective promotion of the function of preserving the image caused by the electrostatic charge on the rear surface by separating the transparent electrode from the photosensitive element while the application of the second field is continued after interruption of the irradiation by the light image.

In order to indicate still more fully the nature and details of the invention, the following examples are set forth.

EXAMPLE 1

Fine particles of CdS having a mean grain size of 10 microns and activated by copper were bonded together by means of a binder consisting of cellulose nitrate and shaped into a thin layer of 80 microns thickness. As shown in FIG. 1, to one surface of a layer of a photoconductive substance 1 consisting of said layer, a highly insulative film 2 made of a transparent polyester resin of 12.5 microns thick, for example, was cemented by means of a binder of a polyester resin. A thin layer of conductive material such as aluminum foil was cemented to the opposite surface of the layer 1 to form an electrode 3 by means of a suitable binder, thus completing a photosensitive element.

As shown in FIG. 3, an electrode 4 made of glass which is transparent to light rays, such as those sold by the Corning Glass Co., U.S.A., under the trade name of NESA Glass, was placed upon the highly insulative film 2 and urged thereagainst by means of a suitable pressure appling device, not shown. Thereafter a D-C field or voltage of 1500 v. was applied for 0.1 sec. with the transparent electrode 4 connected to the positive terminal and the electrode 3 of the photosensitive element connected to the negative terminal in the absence of any incident light ray. Then the polarity of the impressed D-C field was reversed concurrently with irradiation by a light image of a brightness of 20 luxes at its bright portions. After an elapse of 0.1 sec., the irradiation of the light image was stopped, and the transparent electrode 4 was separated from the photosensitive element while the application of the D-C field was continued.

After complete separation, an intense visible image was produced by developing the latent image under daylight by means of charged particles ordinarily employed in developing electrographs.

We found that the intensity of the electrostatic charge of the latent image at portions thereof subjected to light ray irradiation reached −1400 v., whereas those at portions not subjected to light ray irradiation reached −100 v. It was also found that the intensity of the electrostatic charge of the latent image is much higher than that obtainable when the photosensitive element is separated after interruption of the field, and that said intensity corresponds to that obtainable when 2000 v. of D-C voltage is applied, the result being an improvement of more than 40%. In addition, latent images formed by the process of the invention are characterized by their being defined sharply or providing higher resolution. Further, in the method in which the transparent electrode 4 is separated from the photosensitive element after interruption of the application of the voltage, it is necessary to maintain the two electrodes in an insulated condition, whereas by the method of this invention this problem can be readily solved. It was also observed that the method of separating the transparent electrode from the photosensitive element while the field is being applied is also applicable with advantages to the case where the first field is applied.

The same satisfactory result was obtained by repeating the steps described hereinabove with the exception that a four-layered photosensitive element, as shown in FIG. 2, was used wherein a additional film 2a of highly insulative substance, such as a film of a polyester resin having a thickness of 12.5 microns, was inserted between the photosensitive layer 1 and the metal electrode 3.

Since this invention relates to an improvement of the method disclosed in our copending application Ser. No. 471,606, it is advantageous to use a photosensitive element of the same type. More particularly, the photosensitive layer 1 is comprised of fine particles of a photoconductive substance which are bonded together by a binder consisting of a transparent high molecular material having a volume resistivity of more than $10^{10}$ ohm-cm. and are formed into a thin layer of a thickness of less than 200 microns. On one surface of the photosensitive layer 1, there is unitarily cemented a highly insulative film made of a transparent substance having a volume resistivity of more than $10^{11}$ ohm-cm., a surface resistivity of $10^{12}$ ohm-cm., a thickness of less than 50 microns, and a surface-to-surface resistivity per unit area of more than $10^9$ ohms, by means of a binder having a volume resistivity of more than $10^{11}$ ohm-cm. An electrode 3 is unitarily cemented to the surface of the photosensitive layer 1 opposite to the side to which the highly insulative film is cemented.

Alternatively, as shown in FIG. 2, the photosensitive element may include an additional highly insulative film 2a having the same physical and electrical characteristics as the film 2 between the photosensitive layer 1 and the electrode 3 so as to decrease to less than one half the electric field impressed across the photosensitive layer 1 at portions thereof subjected to irradiation of light rays when a D-C field is applied across the photosensitive element.

Further, we have made detailed investigations with reference to the air gap defined between the photosensitive element and the transparent electrode pressed thereagainst and have reached the following conclusions.

As stated hereinbefore, the principle of the method of making electrographs of this invention is based on the variation in the field intensity, which is calculated by the following equation:

$$E \cdot \frac{\epsilon_2}{\epsilon_1 d_1 + \epsilon_2 d_2}$$

If the air gap between the transparent electrode and the photosensitive element is large, the dielectric constant of the air layer will be equal to approximate unity, whereas each of the elements constituting the photosensitive element has substantially a higher dielectric constant, so that the field applied across the two electrodes of the photosensitive assembly will be consumed by the air gap. Accordingly, it will be clear that the effect, caused by a partial charge in the interior of the photosensitive layer due to the irradiation of the light image, upon the state of the electrostatic charge on the surface of the photosensitive element is not great enough to cause a great charge in that state.

Results of our experiments have recreated that, in the above described Example 1, if the air gap has a width of 50 microns, the image forming property will be greatly decreased, so that when the applied D-C voltage is increased from 1500 v. to 2000 v., the potential of the electrostatic charge at portions corresponding to bright portions of the light image will be −300 v., whereas that of the electrostatic charge at portions corresponding to dark portions of the light image will be −50 v. It was also found that further increase of the air gap to 200 microns results in a scale-like pattern of electrostatic charge which is quite independent of the light image and is, therefore, useless for electrography.

The above described fact has already been observed in the art prior to this invention. In fact, the air gap between adjacent electrodes is strictly specified in U.S. Pat. No. 2,825,814, for example. It has been the general practice to abstain strictly from establishing a large air gap in an electric field in methods of making an electrograph by varying the distribution of an electric field applied from the outside in response to the variation in a layer of a photoconductive substance.

However, where it is desired to continuously produce latent images at a high speed by utilizing a continuous optical scanning method, it is highly desirable to apply the electric field by means of an electrode which is amply separated in order to prevent mechanical trouble of the device and mechanical stimulation of the surface of the element and to simplify the mechanism. We have succeeded in using a corona discharge electrode whereby to fulfil the above mentioned requirement, simplify the mechanism, and prolong the useful life of the photoelectric element. The following example, relates to the use of such a corona discharge electrode.

EXAMPLE 2

Figures 7, 8:
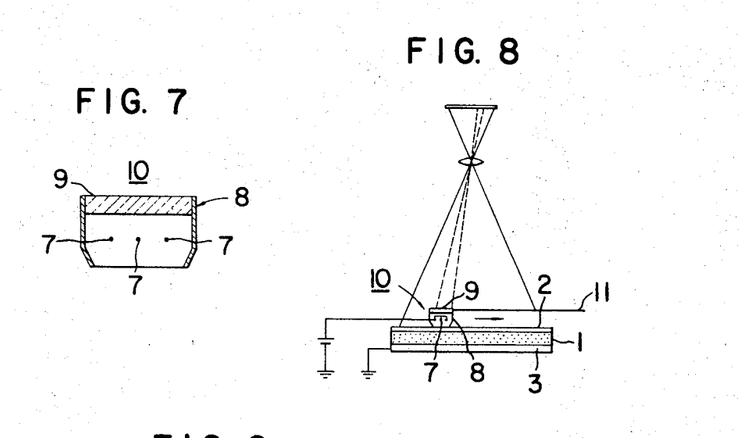
FIG. 7 is a sectional view of a corona discharge electrode suitable for use in carrying out this invention.
FIGS. 8 and 9 show different arrangement of various elements wherein the corona discharge electrode shown in FIG. 7 is utilized.

The corona discharge electrode 10 utilized in these examples is shown in FIG. 7 and comprises a high voltage discharge electrode 7 in the form of a wire grid which is enclosed by a cylindrical grounded (earthed) electrode 8 with its lower end opened. The upper end of the grounded electrode may be closed by a transparent conductor 9, if desired.

As shown in FIG. 8, the corona discharge electrode 10 is disposed above the highly insulative film 2 of a horizontally disposed photosensitive element which is identical to that shown in FIG. 1. A predetermined spacing is maintained between the corona discharge electrode 10 and the highly insulative film so that the former can scan the latter along parallel paths. In front of the corona discharge electrode 10, there is arranged a light shielding plate 11 adapted to shield out the projection of the light images in the area in front of the corona discharge electrode as viewed in the direction of scanning. Both of the grounded electrode 8 and the electrode 3 of the photosensitive element are suitably grounded while the high voltage discharge electrode 7 is connected to a high voltage D-C source through a suitable polarity reversing switch, not shown.

In this manner, a positive potential was applied to the high-voltage discharge electrode 7 of the corona discharge electrode 10 in the absence of any external light rays, and the entire surface of the photosensitive element was scanned at a speed of 300 mm. per second. Then the element was again scanned at the same speed while a negative potential was applied to the high voltage discharge electrodes 7, and the light image was projected upon the photosensitive element through the transparent electrode 9.

Upon completion of the scanning of the entire surface, the supply of the potential was interrupted, and the whole system was exposed to daylight. Thereafter, the latent image formed on the surface of the photosensitive element was developed by means of a developer containing a toner which is commonly used in electrography and charged with positive electricity, whereupon an intense visible image wherein the toner adhered only to portions corresponding to bright portions of the light image was obtained.

When the intensity of illumination at bright portions of the light image was 15 luxes, the width of the light image projected on the photosensitive element through the transparent conductor 9 was 20 mm., and when a potential of −7000 v. was applied to the high voltage discharge electrode 7, the potential of the electrostatic charge of the latent image at portions corresponding to bright portions of the light image was found to be −1200 v., whereas that of the portions corresponding to the dark portions of the light image was −100 v.

Upon further analysis of the characteristics of the device discussed in this example, the following observations were made.

(a) When the thickness of the highly insulative film on the surface of the photosensitive element is reduced extremely, and the thickness of the photosensitive layer is maintained constant, the photosensitivity of the latent image is increased to improve the resolution of the latent image, but when exposed to intense daylight, the latent image has a tendency to be disturbed, and the potential of the electrostatic charge decreases slightly.

(b) When an electric field due to corona discharge is applied after irradiation by the light image, it is difficult to obtain satisfactory results owing to the rapid attenuation of the effect of the irradiation by the light image.

(c) Where the same photosensitive element is used for Examples 1 and 2, the latter or the method utilizing the corona discharge electrode provides higher sensitivity even with less quantity of incident light rays.

(d) When the corona discharge of the second field which was commenced concurrently with the irradiation by the light image is continued after interruption thereof, the ratio between brightness and darkness of the latent image decreases.

(e) Reversal of the polarities of the first and second fields does not result in substantial charge except in the case of reversal of the polarity of the latent image.

(f) The relationship between the time interval of applying the first field and its effect and that between the time interval of applying the second field and its effect are identical to that obtained by utilizing a transparent electrode in Example 1, and application time of a fraction of one second or less is satisfactory.

(g) With regard to other characteristics, it may be considered that the transparent electrode is replaced by an air layer in which a corona discharge is occurring, so that the air layer acts as an electrode.

Upon the basis of the above described Example 2 we have completed a novel continuous image forming mechanism utilizing an optical scanning system.

EXAMPLE 3

Figure 9:
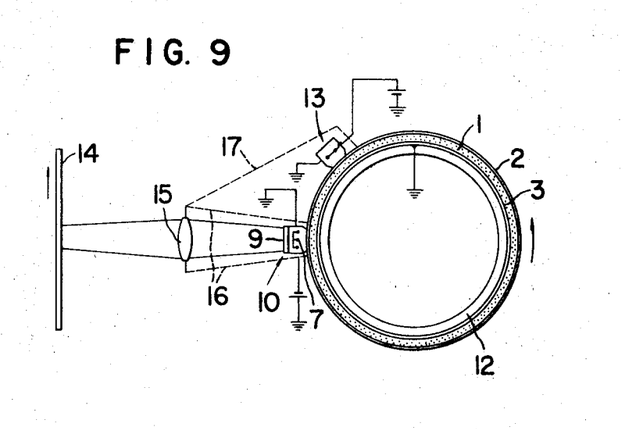

FIG. 9 represents this continuous image forming mechanism comprising a rotary drum 12 which is made of a suitable conductive material and is horizontally journalled in a supporting frame, not shown. A photosensitive element identical to that used in Example 1 is wrapped around the rotary drum 12, and a corona discharge electrode 10 identical to that discribed in connection with FIG. 7 is mounted to face one side of the rotary drum with a sufficient air gap between the electrode 10 and the photosensitive element. Somewhat above the corona discharge electrode 10, there is positioned a conventional corona discharge electrode 13 with a sufficient gap between it and the photosensitive element.

High potentials of suitable polarities are respectively applied to these corona discharge electrodes 10 and 13 from a suitable source of supply via switches, if required, and appropriate elements of these discharge electrodes are grounded in a manner already described. A lens 15 is positioned on the outside of the corona discharge electrode 10 to project the light image of an object 14. The lens 15 and the discharge electrode 15 are enclosed by a light shield 16. Also, the corona discharge electrode 13 and the portion of the surface of the photosensitive element located between the electrodes 10 and 13 are enclosed by a separate light shield 17.

A potential of +7000 v. with respect to the electrode 3 of the photosensitive element is applied to the high potential electrode of the corona discharge electrode 13 while a potential of −7000 v. is applied to the discharge electrode 7 of the corona discharge electrode 10. The rotary drum 12 is rotated in a direction indicated by the curved arrow at a peripheral speed of 300 mm./sec. while the object is moved in a direction by the straight arrow at a speed of 300 mm./sec. in synchronism with the rotation of the drum 12, thereby projecting the light image of the object 14 at an intensity of 15 luxes through the lens 15 and the transparent conductor 9 onto the surface of the photosensitive element over a width of 20 mm. As a result, a latent image is continuously formed on the surface of the photosensitive element, having a potential of −1200 v. at portions corresponding to the bright portions of the light image and −100 v. at portions corresponding to dark portions thereof.

A visible image is obtained by continuously developing the latent image formed by means of a charged powder commonly utilized in electrography. The visible image obtained can be transfer printed to a suitable recording paper. It was found that it is possible to use repeatedly the photosensitive element after removing the toner remaining on the surface thereof.

Then the polarities of the potentials impressed upon the high voltage electrodes of the corona discharge electrodes 10 and 13 were reversed. That is, a potential of +7000 v. was applied to the corona discharge electrode 10, and a potential of −7000 v. was applied to the corona discharge electrode 13 at the time of projection of the light image to repeat the above operation. As a result potentials of +1200 v. and +100 v. were observed on the surface of the light sensitive element respectively at portions corresponding to bright and dark portions of the light image. This latent image can be rendered visible by utilizing a powder developer charged with electricity of the opposite polarity, and the developed image can be transfer printed.

Thus, this embodiment of the invention provides a novel method of continuously making electrographs by utilizing a perfectly insulated photosensitive element provided with a highly insulative film on its outermost surface without relying upon any mechanical stimulation.

As will be clear from Examples 2 and 3 and descriptions relating thereto, the corona discharge utilized in this invention plays a unique role. In prior electrography arts, corona discharge has been considered as being an important fact. Since the invention of xerography by Carlson, corona discharge devices have been actually provided for almost all practical electrographic apparatuses in order to solve the problem of imparting uniform electrostatic charge. However, in all of these prior systems which are intended to utilize directly the so-called photoconductivity, first, a uniform charge is imparted in a dark space on the entire surface of a photosensitive element, and then the charge is locally released by the subsequent irradiation of the light image.

For this reason, charging by corona discharge is important from the standpoint of imparting photosensitivity. In other words, since the electrostatic charge imparted to the entire surface of the photosensitive element by a corona discharge in dark space is caused to vary by irradiation of light rays, it may be said that the above described photosensitivity has the same significance as that of the photography utilizing silver salts. Therefore, if the latent image is exposed to external light rays after irradiation of the light image but prior to development, it will disappear at once.

Furthermore, it is clear that portions of the surface of the photosensitive element that have received no or but little light rays corresponding to dark portions of the light image show higher potential of electrostatic charge.

In contrast, in this invention, since the light sensitive element is formed with a highly insulative film on its surface, the photosensitive layer contained in the element is required to operate only at the time of forming the latent image, so that the photosensitive layer is designed not to be effective after interruption of the applied field. Consequently, in spite of the fact that corona discharge is utilized, the latent image is never varied when subjected to any external light after completion of the latent image.

It is to be observed particularly that the corona discharge employed in this invention is created to produce an electric field concurrently with the irradiation by the light image, whereby to impart the electrostatic charge at portions irradiated by light rays. When compared with well known systems, this method is more effective for utilizing the applied field so that it can form the latent image at a higher sensitivity notwithstanding the fact that it utilizes a photoconductive substance as the photosensitive layer, as is apparent from above described examples. In addition, this feature of this invention suggests various applications different from conventional systems.

While the above described unique nature of photosensitivity is mainly due to the highly insulative film formed on the photosensitive element, this nature affords very advantageous conditions for the attenuation of the latent image in dark space. More specifically, in well known systems, it is essential to preserve the electrostatic charge on the surface of the layer, itself, of a photoconductive substance and to release rapidly this surface charge by subsequent irradiation by light rays.

Thus, in these prior systems it is necessary to resort to a suitable compromise between these two contradicting requirements. In contrast, in the photosensitive element utilized in this invention, it is only necessary to select the layer adapted to preserve the charge from any one of many highly insulative materials that are transparent to light rays employed in electrography. Thus, it is possible to select a material having high volume resistivity as well as high surface resistivity, whereby it is possible to readily form latent images which are characterized by being not sensitive to light without being accompanied by the difficulties of prior systems.

One example of systems capable of preserving latent images formed in non-photosensitive state is disclosed in U.S. Pat. No. 2,693,416, which is characterized by the steps of forming a latent image on an insulative film which is removably superimposed upon a photosensitive layer and then separating the insulative film to isolate it from the photosensitive element. This prior system also utilizes a charge in the photoconductive layer, said charge extending to the surface of the insulative layer and being caused by projecting a light image onto the insulative film which has been treated with a corona discharge in dark space. Accordingly the system has no characteristic difference in process steps over the Carlson method.

It is thus clear that the photosensitivity will be lost after separation of the insulative film and that the mechanism of forming and preserving latent images is quite opposite to that of this invention. Also, in the method disclosed in said U.S. Pat. No. 2,693,416, although means are provided to urge the separable insulative film against the layer of photoconductive substance, it is extremely difficult to assure uniform contact between different layers over a relatively wide area. In contrast, the method of this invention, wherein the electric field is applied by a corona discharge electrode positioned amply spaced from the surface of the highly insulative film which is integral with the photosensitive element, is more advantageous in that it can provide an extremely uniform latent image.

While the foregoing brief theoretical analysis has been presented for the purpose of facilitating understanding of the principle of this invention, it will be clear that the invention is not limited to this analysis.

Summarizing the above disclosure in accordance with this invention, a perfectly insulated type photosensitive element having on its surface a highly insulative film adapted to preserve a latent image is utilized, and an electrostatic latent image is formed on said highly insulating films by the steps of applying an electric field to said photoelectric element, in a dark space, of a polarity opposite to that of an electric field applied concurrently with irradiation by a light image, reversing the polarity of said first mentioned field simultaneously with projection of said light image on the photosensitve layer of said photosensitive element, interrupting the projection of the light image while the field is being applied and subsequent to the interruption of the projection of the light image, and removing an electrode which has been urged against the highly insulative film on the surface of the photosensitive element. Thus the method of the invention is advantageous in that it can provide a higher resolution under a low applied field and that the device utilized in carrying out the method can be readily manipulated. Further, by applying the field by means of a corona discharge, uniform images can be continuously formed by scanning technique.

While the invention has been shown and described in connection with some preferred embodiments thereof, it should be understood this invention is not limited thereto and is intended to include many modifications and alterations thereof as fall within the true spirit and scope of this invention.

For example, an electric field may be applied across the photosensitive element by any conductive electrode other than the corona discharge electrode and transparent electrode.

What we claimed is:

1. An electrographic method which comprises the steps of: preparing a photosensitive element by bonding finely divided particles of an electrically photosensitive material by means of an electric insulating material which is transparent to light, shaping the bonded particles into a thin layer to provide a photosensitive layer, integrally bonding to one surface of said photosensitive layer a transparent highly insulative film, and integrally applying a first electrode on the surface of said photosensitive layer opposite to said highly insulative layer thereby to provide said photosensitive element; disposing a transparent electrode in contact against said highly insulative film; applying a potenial of one polarity across said electrode of said photosensitive element and said transparent electrode in the absence of external light rays; applying a second potential of a polarity opposite to that of said first mentioned potential across said electrodes concurrently with irradiation of a light image onto said photosensitive element through said transparent electrode; interrupting said irradiation of the light image after a predetermined time; and removing said transparent electrode from said photosensitive element while said second potential is being applied across said electrodes whereby to form on said highly insulative film an electrostatic image of said light image, said latent image being characterized in that it is not released by any subsequent irradiation by light rays.

2. An electrographic method which comprises the steps of: preparing a photosensitive element by bonding finely divided particles of an electrically photosensitive material by means of an electric insulating material which is transparent to light, shaping the bonded particles into a thin layer to provide a photosensitve layer, integrally bonding to one surface of said photosensitive layer a transparent highly insulative film, and integrally applying a first electrode on the surface of said photosensitive layer opposite to said highly insulative layer thereby to provide said photosensitive element positioning a corona discharge electrode in close proximity to but spaced apart by a definite distance from the surface of said highly insulative film; continuously moving said corona discharge electrode relative to said photosensitive element to scan it while a high potential of one polarity is being applied across said corona discharge electrode and said electrode of said photosensitive element; applying a second high potential of the opposite polarity across said electrodes; and continuously moving said corona discharge electrode relative to said photosensitive element to scan it concurrently with the irradiation of a light image of an object onto said photosensitive element whereby to form on said photosensitive element an electrostatic latent image of said light image, said light image being characterized in that it is not released by any subsequent irradiation by light rays.

3. The electrographic method according to claim 1 wherein said finely divided particles of a photosensitive material are bonded together by a transparent binder having a volume resistivity of more than $10^{10}$ ohm-cm. and then shaped into a photosensitive layer having a thickness of less than 200 microns, and wherein said photosensitive layer is integrally bonded to said transparent highly insulative layer having a volume resistivity of more than $10^{11}$ ohm-cm., a surface resistivity of more than $10^{12}$ ohms/cm.$^2$, a thickness of less than 50 microns and a surface-to-surface resistivity per unit area of more than $10^9$ ohms by means of a binder having a volume resistivity of more than $10^{11}$ ohm-cm.

4. The electrographic method according to claim 1 wherein a second highly insulative film is interposed between said photosensitive layer and said first electrode and integrally bonded thereto.

5. The electrographic method according to claim 2 wherein said finely divided particles of a photosensitive material are bonded together by a transparent binder having a volume resistivity of more than $10^{10}$ ohm-cm. and then shaped into a photosensitive layer having a thickness of less than 200 microns, and wherein said photosensitive layer is integrally bonded to said transparent highly insulative layer having a volume resistivity of more than $10^{11}$ ohm-cm. a surface resistivity of more than $10^{12}$ ohms/cm.$^2$, a thickness of less than 50 microns and a surface-to-surface resistivity per unit area of more than $10^9$ ohms by means of a binder having a volume resistivity of more than $10^{11}$ ohm-cm.

6. The electrographic method according to claim 2 wherein a second highly insulative film is interposed between said photosensitive layer and said first electrode and integrally bonded thereto.

7. A method of electrography comprising the steps of disposing an electrode adjacent a photosensitive element including an electrically photosensitive layer exhibiting persistent internal polarization and an electric insulating film bonded to one surface of the photosensitive layer, applying a first electric field of one polarity across said electrode thereby charging said element, applying a second electric field of the opposite polarity across said electrode thereby charging said element, exposing said element to an information containing light image concurrently with the application of said second field, interrupting said exposure to light image after a predetermined time and moving said electrode relative to said photosensitive element while said second field is still being applied across said electrode whereby there will be formed an electrostatic latent image on said element corresponding to said light image, said latent image being characterized by being not erased by later light radiation.

8. The method of electrography according to claim 7, wherein said electrostatic latent image is developed with developer material to provide a developed visual image.

9. A method of electrography comprising the steps of applying a first electric field of one polarity by means of corona discharge means including at least one corona discharge electrode across a photosensitive lement including an electrically photosensitive layer exhibiting persistent internal polarization and an electric insulating film bonded to one surface of the photosensitive layer, said corona discharge electrode across a photosensitive element including but spaced apart by a definite distance from said element, applying a second electric field of the opposite polarity across said element by said corona discharge means, exposing said element to an information containing light image concurrently with the application of said second field thereby to form on said element an electrostatic latent image characterized by being not erased by later light irradiation.

10. The method of electrography according to claim 9, wherein said discharge electrode and said photosensitive element are moved relative to each other to scan the surface of said photosensitive element during application of said first and second electric fields.

11. A method of electrography comprising the steps of applying a first electric field of one polarity by means of a first corona discharge electrode across a photosensitive element including an electrically photosensitive layer exhibiting persistent internal polarization and a highly insulative layer integrally bonded to one side of said first layer, said first corona discharge electrode being disposed in close proximity to but spaced apart by a definite distance from the surface of said highly insulative film; continuously moving said corona discharge electrode relative to said photosensitive element to scan it; applying a second electric field of the opposite polarity across said photosensitive element by means of a second corona discharge electrode spaced apart from said first corona discharge electrode; exposing said photosensitive element to an information containing light image concurrently with the application of said second field; and continuously moving said second corona discharge electrode relative to said photosensitive element concurrently with said exposure thereof to said information containing light image, thereby to form an electrostatic latent image on said highly insulative layer corresponding to the light image by the electric charge applied on the surface of said highly insulative layer, said latent image being characterized by being not erased by later light irradiation.

12. The method of electrography according to claim 11, wherein said photosensitive element is mounted on a rotary cylinder with said highly insulative layer faced outwardly, said first and second corona discharge electrodes are positioned around the said cylinder but spaced apart from the surface of said highly insulative layer and said second corona discharge electrode is positioned behind said first corona discharge electrode as viewed in the direction of rotation of said rotary cylinder.

References Cited

UNITED STATES PATENTS

| 2,825,814 | 3/1958 | Walkup | 250—49.5 |
| 2,833,930 | 5/1958 | Walkup | 250—49.5 |

GEORGE F. LESMES, Primary Examiner

J. C. COOPER III, Assistant Examiner

U.S. Cl. X.R.

96—1.3, 1.5, 1.8; 117—17.5; 346—74; 355—3

UNITED STATES PATENT OFFICE
CERTIFICATE OF CORRECTION

Patent No. 3,536,483              Dated October 27, 1970

Inventor(s) Yoshiyuki Watanabe et al.

It is certified that error appears in the above-identified patent and that said Letters Patent are hereby corrected as shown below:

Column 15, line 32, "lement" should read -- element --; line 36, after "electrode" insert -- being disposed in close proximity to --; same line 36, cancel "across a photosensitive element includ-".

Signed and sealed this 15th day of August 1972.

(SEAL)
Attest:

EDWARD M. FLETCHER, JR.　　　　　　　　ROBERT GOTTSCHALK
Attesting Officer　　　　　　　　　　　　Commissioner of Patents